United States Patent [19]

Roddewig

[11] Patent Number: 4,974,334
[45] Date of Patent: Dec. 4, 1990

[54] PROCEDURE AND DEVICE FOR DRYING AND/OR CALCINING OF POWDERY MATERIALS

[76] Inventor: Dieter Roddewig, Am Butterberg 35, 3360 Osterode, Fed. Rep. of Germany

[21] Appl. No.: 221,460
[22] PCT Filed: Dec. 3, 1986
[86] PCT No.: PCT/DE86/00495
§ 371 Date: Jul. 29, 1988
§ 102(e) Date: Jul. 29, 1988
[87] PCT Pub. No.: WO87/03508
PCT Pub. Date: Jun. 18, 1987

[30] Foreign Application Priority Data

Dec. 4, 1985 [DE] Fed. Rep. of Germany ....... 3542904

[51] Int. Cl.$^5$ .............................................. F26B 3/08
[52] U.S. Cl. ...................................... 34/10; 34/57 A; 34/164
[58] Field of Search ................. 34/57 A, 164, 11, 182, 34/10

[56] References Cited

U.S. PATENT DOCUMENTS

| | | | |
|---|---|---|---|
| 2,832,584 | 4/1958 | Plante | 34/164 X |
| 3,063,848 | 11/1962 | Van Gelder | 34/57 A X |
| 3,161,483 | 12/1964 | Morris | 34/164 |
| 4,305,210 | 12/1981 | Christensen et al. | 34/164 X |
| 4,371,375 | 2/1983 | Dennis, Jr. et al. | 34/11 |

Primary Examiner—Henry A. Bennet
Attorney, Agent, or Firm—Robert W. Becker & Associates

[57] ABSTRACT

Procedure and device for drying and/or calcining powdery material. The device includes at least one feed mechanism, a heated treatment area, and at least one withdrawal mechanism for the material. The treatment area is provided with a base that can vibrate and through which gas can flow.

32 Claims, 1 Drawing Sheet

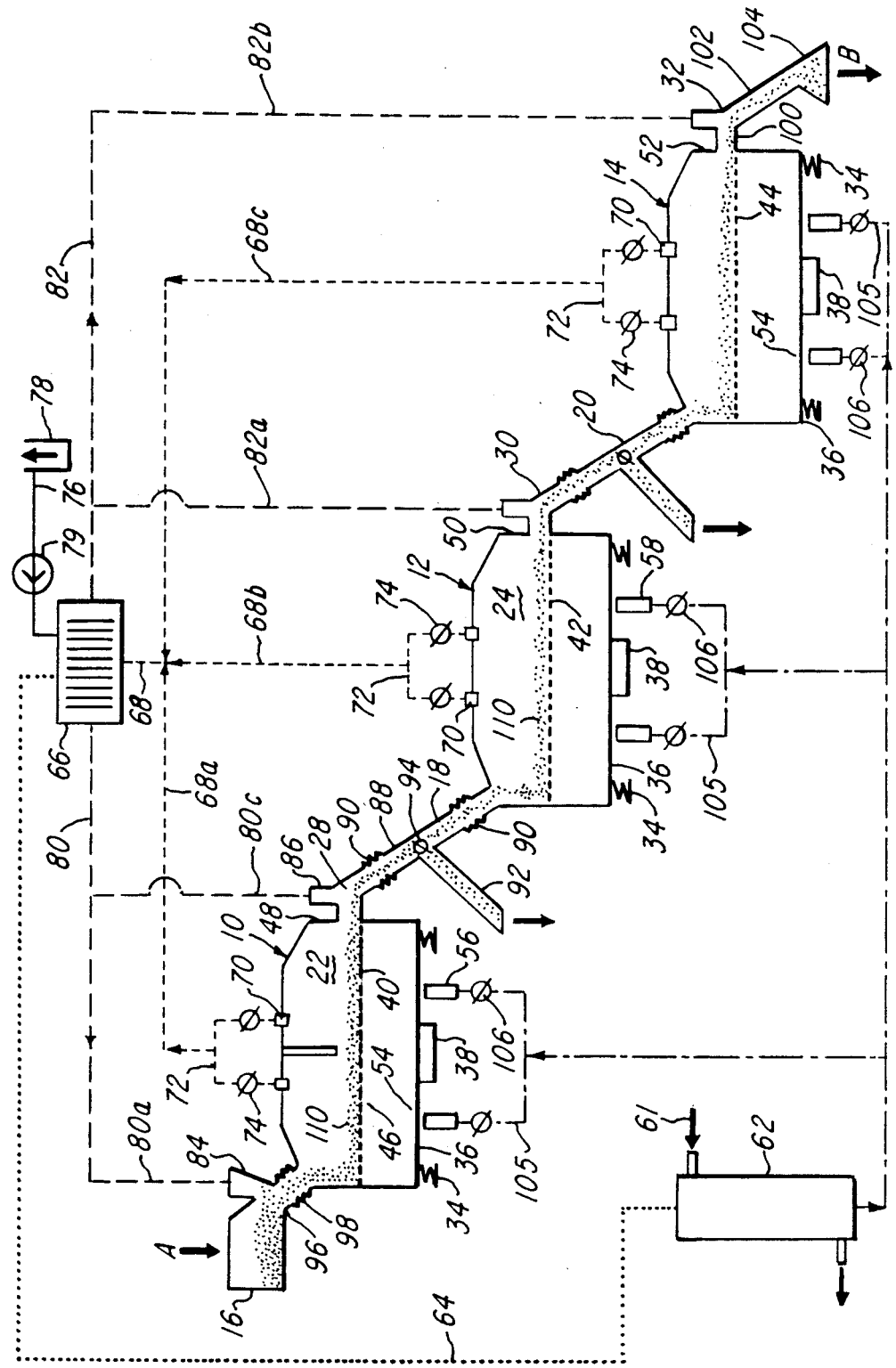

PROCEDURE AND DEVICE FOR DRYING AND/OR CALCINING OF POWDERY MATERIALS

The present invention relates to a procedure and a device for drying and/or calcining powdery materials.

BACKGROUND OF THE INVENTION

In various fields of technology, powdery materials have to be dried and/or burned (calcined) in order to remove surface humidity and/or chemically bound water, and in order to prepare material for further processing.

For example, in the gypsum industry, it is necessary to dry the natural gypsum, which was excavated above or below ground, and which has a quarry or inherent water content of about one to three per cent by weight, in order first to remove the adsorbed surface humidity and in order to subsequently calcine, with different calcium sulfate hydrate qualities being formed as a function of the temperature and time.

Numerous procedures and devices are known for drying and calcining natural gypsum.

In contrast, problems arise when treating particularly fine powdery materials, especially calcium sulfate products, during the treatment of synthetic calcium sulfate materials, such as the so-called chemical and desulfurization gypsums. The latter are the end product obtained during desulfurization, for example during a washing procedure with limestone ($CaCO_3$) or with calcium hydroxide ($Ca(OH)_2$) or with calcium oxide ($CaO$). Such desulfurization gypsum is called calcium sulfate dihydrate ($CaSO_4 \cdot 2H_2O$).

Such desulfurization gypsum differs in many ways from natural gypsum. Already in the raw or crude state, the desulfurization gypsum is much more finely crystallized and has due to the method of production, grain sizes of sometimes much less than 50 $\mu$m. The crystalline appearance also differs from that of natural calcium sulfate dihydrate. Furthermore, the adsorbed surface humidity of desulfurization gypsum is approximately ten per cent by weight greater than that of natural gypsum (about one to three per cent by weight).

Obviously, such products cannot be treated by conventional drying and/or calcining procedures and devices. Even the transport of the finely grained and moist desulfurization gypsum causes difficulties due to the undesirable "formation of lumps", which quickly results in the clogging of conveying units and transport mechanisms. The moist desulfurization gypsums are therefore dried prior to delivery to customers (discharge systems), because available conveying and calcining units cannot operate in a disturbance-free manner with moist material (Zement Kalk Gips 5 (1983) 271, 273).

However, the drying itself causes difficulties due to the described properties of the synthetic calcium sulfate products, and relatively expensive dryers, such as centrifugal hydroextractors, are used to aid in the process, though they permit only a partial removal of water. Thereafter, transport is in fact somewhat easier, but the described technical difficulties have not yet been eliminated. Moreover, the material, which is still very finely grained, cannot be calcined in conventional calcining equipment without further preparation.

Projects known up to now (Zement Kalk Gips (see above); Umwelt 6 (1983), 435) propose a nodulizing or agglomeration and a subsequent comminution or pulverizing to improve the unfavorable grain structure and the particle structure, as well as to influence the rheological characteristics. The agglomeration is to be carried out with briquetting presses or with pelletizing machines, which lead to coarsening of the grain.

Thus, the material, which is still moist, has to be additionally treated. Supplementary equipment is necessary. Such equipment is not only expensive, but considerably increases the cost of preparation of the aforementioned products, and in addition is susceptible to breakdown.

Another proposal (Umwelt, see above) proposes the production of material in pieces or lumps by pan mills: however this results in the same drawbacks.

The known procedures for preparing such finely grained and powdery materials have, for the aforementioned range of application, have the further drawback that already for reasons of cost, the compacting mechanisms required for producing a material that can be transported to cement or gypsum plants cannot be coupled with each desulfurization plant.

Other solutions have not yet become known, although there is an urgent need in this regard. Pursuant to recently passed regulations for large-furnace plants, as part of the Federal Air Pollution Control Law, power stations have to be equipped with desulfurization units by Jan. 1, 1988, and old plants have to be appropriately retrofitted, as a result of which a considerable amount of the aforementioned desulfurization gypsum will be produced.

DE-OS No. 31 29 878 discloses a procedure for producing gypsum from the desulfurization mud of desulfurization plants, with the desulfurization mud being calcined in layers as cakes. Also during this procedure the finely grained starting material will receive a new form, here layer cakes, prior to the calcining. The laYer cakes present a greater volume than do pellets or briquets. As a result, a uniform and efficient calcining is made more difficult.

It is an object of the present invention to provide a procedure and a device for drying and/or calcining powdery material that enable, at a lower expense for apparatus and energy, an easier production especially of finely grained and powdery material having a grain fraction that is predominantly below 100 $\mu$m. In this connection, the possibility should preferably also be provided for being able to work continually and/or in an energy-saving manner.

In contrast to the previously disclosed proposals, the present invention recognizes that it is not necessary to solve the aforementioned problems that occur during the drying and/or calcining of powdery, especially fine-grained, material (pursuant to the present invention this means powdery material having a particle fraction that predominantly has a grain size of less than 100 $\mu$m, especially powder where a predominant fraction of the particles has a grain size of less than 50 $\mu$m) by first predrying the powdery material in special drying units and then compacting them for the main drying or calcining. Rather, the present invention foresees direct feeding of appropriately treated material to a drying and/or calcining unit. This applies in particular for powdery materials of the aforementioned type that have a large content of adsorbed water, such as synthetic calcium sulfate hydrate products obtained during desulfurization in power plants.

It was completely surprising that such materials could be directly introduced into a heated treatment area, without any prior supplementary preparation such as predrying and/or agglomerating, if this treatment area is divided by an essentially horizontal base, and if the base is embodied as an air/gas-permeable vibration or oscillation table.

The feeding of the aforementioned powdery, finely grained materials can be carried out in that state in which the material exists at the operating site; thus, for example, in the case of so-called desulfurization gypsums, in the form of a more or less humid mud. It has been shown that in the beginning a forced dispersal or loosening of the possibly agglomerated, very fine particles can be achieved by guiding hot gases (hot air) through the appropriately permeable base (which hence operates as a heat transfer surface) if, at the same time, the base through which the gas flows is embodied as a vibration or oscillation table, in other words, if the base executes a continuous oscillation or vibration movement at as low an amplitude as possible. Then, with an appropriate adjustment of the oscillation amplitude, the size, shape, and number of the openings in the base, and/or the speed and temperature of the hot gas that passes through, the material that is to be treated receives a greater or lesser "fluidization", so that it is transported over the base. The transport of the material from a feed mechanism to a generally oppositely disposed withdrawal mechanism is thereby effected by an appropriately oriented discharge direction of the hot gases from the intermediate base and/or the direction of movement of the vibration or oscillation table.

Correspondingly, advantageous embodiments of the present invention provide a base that is movable in pulsation in an involute oscillation, with the longer involute amplitude or side indicating the direction of transport of the material.

In the same way, it also possible to influence the direction and speed of transport by an appropriate configuration of the hot gas discharge openings of the base. If the intermediate base is made of sheet metal, preferably sheet steel, a precise stream direction can be easily achieved by forming the openings as sections that are stamped in the direction toward the upper portion of the treatment area and that are opened only in the direction of transport, with the upwardly stamped or pressed portions of the sheet metal serving to guide or deflect the hot air/hot gas. Thus, the production of the intermediate base is not effected by a simple stamping, but rather by a pressing out, similar to the situation of a rasp. The openings are preferably very small and are disposed very close to one another in order to enhance the fluidization effect of the material that is guided over the openings.

Similarly, pores and openings of sintered materials, which are also proposed as base material pursuant to the present invention, can be produced with a precise orientation. The same is true for porous ceramic materials, which are especially proposed for temperatures over 600° C.

Pursuant to a further advantageous embodiment of the present invention, the rake or angle of inclination of the base can be changed, in other words, for example, the base can also rise in the direction of transport The angle of inclination is preferably infinitely variable, so that especially in combination with the stream speed of the hot gases, it is also possible to have a regulation/control of the transport speed of the material that is guided over the base.

In order to move the intermediate base, two alterative embodiments of the present invention provide for appropriate oscillation and vibration units that are disposed either directly on the base, or the forced agitator is mounted at the treatment area, so that the latter is subjected to the entire described vibration, which has the advantage that material that may adhere to the walls of the treatment area is again shaken therefrom. In both cases, the vibration or oscillation table and/or the treatment area are mounted with suspension or elastically.

By the possibility of using ceramic material for the base, it is also possible to use the inventive device in a high temperature range of over 1000° C. The treatment area is then preferably entirely provided with a refractory lining, for example of suitable ceramic fibrous material.

An advantageous further development of the present invention provides for arranging burners beneath the transport base for the purpose of heating an air guidance. It has been proven that the speed of the combustion gases coming from the burners is sufficient to achieve a gas guidance through the gas-permeable base in the desired manner. Suitable burners are selected as a function of the desired temperature and size of the openings in the base. Among others, high-pressure atomization burners, low-pressure torches, and also spin-stabilized burners have been shown to be suitable. The burners are preferably disposed parallel to the intermediate base in order to achieve a uniform temperature over the surface of the base. If necessary in order to enhance the heating, burners could also be disposed in the region above the intermediate base.

An alternative embodiment of the present invention provides for disposing the burners outside the treatment area, i.e. below and in front of appropriate openings in the bottom of the treatment area. This ensures that no oscillations are transmitted from the treatment area to the burners. At the same time, the air gap between the burners and the wall of the treatment area can be used for the supply of secondary air, as a result of which a type of injection effect is created. It is, of course, also possible to couple the burners and the treatment area in a gastight manner via an appropriate flexible coupling. Instead of heating with burners, it is also possible to provide an indirect heating, for example an electric heating (microwaves) or an infrared heating. In such a case, additional fans are provided in the treatment area in order to convey the air/gas through the porous base.

It is also proposed pursuant to the present invention to divide the treatment area into different zones or sections between the feed and withdrawal mechanisms and hence in the direction of transport of the material that is to be treated This is effected in one advantageous inventive embodiment by, for example, slides or plates that are movable from the top of the upper section of the treatment area in the direction toward the intermediate base, thereby on the one hand assuring that the material can flow over the base in an unobstructed manner, and on the other hand, however, appropriate sections or zones of different humidities can be formed along the transport path in conformity with a progressive drying effect, thereby on the whole increasing the effectiveness of the device. These structural measures especially exhibit their effectiveness if at least one suction mechanism, which can preferably be regulated and/or controlled, is provided in the upper portion of the treatment area, so that the more or less humid exhaust gases, which are more or less enriched with solid particles, can be withdrawn from the treatment area. In this way, the efficiency of the inventive device is further optimized, especially if each individual section within the treatment area is equipped with its own suction mechanism.

Pursuant to another structural embodiment of the present invention, the transport lines that are connected to the individual suction mechanisms are guided into one or more dust collection units. Here it is possible not only to free the exhaust gases from dust, but, pursuant to a further embodiment, the merging hot air can be supplied to a heat exchanger that is coupled with one or more of the burners, and the dust that is collected can be guided back to the feed and/or withdrawal mechanism of the device.

Especially by means of the selective return of the solid material recovered from the dust collection unit, the control of the drying and/or calcining procedure can be set as a function of the respective degree of drying and/or calcining.

Pursuant to a further advantageous specific embodiment of the present invention, the feeding and withdrawal of the material that is to be treated can be adapted to the novel drying and/or calcining device, for which purpose the appropriate transport means are to be embodied as vibration and/or air conveying chutes. In this connection, it is particularly advantageous if the appropriate transport means, similar to the previously described device, are provided with a gas-permeable transport base through which hot gases are guided from below. As a result, a certain loosening or dispersal and predrying can already take place as the material is fed into the device.

The feed and withdrawal mechanisms, as well as the other described connections to the device, are preferably coupled to the treatment area in a dusttight and/or gastight manner.

The inventive device can be used not only just as a dryer, but exclusively for calcining the materials. In conformity with the required treatment temperatures, merely the materials for the treatment area and its components as described above, have to be adapted, with the rest of the construction remaining the same.

In order to dry and/or calcine materials, the material stream can also be conveyed several times through one and the same device, in which connection at least one partial stream is conveyed back from the withdrawal mechanism to the feed mechanism.

Especially where the same material stream is conveyed several times through the inventive device, it was totally surprising that although at first a loosening of the material takes place pursuant to the inventive procedure, and hence a particularly uniform and intensive drying/calcining is effected, as the retention time of the particles in the inventive device increases, an agglomeration of the fine particles to form larger structures, and hence a sort of automatic pelletizing, is again effected. The reasons for this phenomenon cannot yet be explained. However, tests have shown that in particular the surface tension of the particles, and their affinity toward one another, especially during longer retention times in the inventive device or when conveyed through several times, increases and rises respectfully to such an extent that the aforementioned automatic agglomeration occurs.

Thus, the present invention presents various drying and/or calcining procedures and pertaining devices.

For example, it is possible to use the inventive device exclusively for drying the aforementioned materials, whereby the device for the drying of desulfurization gypsum, can be coupled directly without difficulty to a desulfurization plant due to its compactness. The drying can be carried out in such a way that, especially where the material is guided through the dryer once and/or relatively shortly, finely powdery material is discharged that differs from the supplied material essentially only by a reduced content of free water, so that transport, for example in silo or tank trucks, is possible.

The material dried in this manner can be calcined with an essentially structurally identical or other known burner or calcining units.

However, it is also possible to slow down the drying in the described manner in order to finally be able to withdraw from the dryer a pelletized product that can then also be supplied to conventional calcining units.

In any case, with the least possible expense, not only is a direct drying possible on location "at the coal face" in the power station, but the physical appearance or characteristic of the product that is to be dried can be individually adjusted. If dried material in pellet form is desired, it is possible to accomplish this without using the described expensive known pre-drying and compacting devices, which in addition are susceptible to failure.

The present invention also offers the possibility of first drying the material, and then, in one in the same device, calcining the material by increasing the temperature (via the burner) and again conveying the material through the device.

For such a procedure, another advantageous specific embodiment of the present invention provides for the linking together of at least two of the mentioned devices, with a transportation connection for the material that is to be treated being disposed between the withdrawal mechanism of one device and the feed mechanism of another device connected thereto. The powdery material is transferred from a first device into a second device, where a higher temperature is established in the treatment area. Depending upon the degree of drying and/or calcining that is desired, the temperatures and the speed of transport of the material through the treatment areas can be adjusted. The transport speed is preferably achieved by an appropriate adjustment of the gas-permeable base.

Obviously, a greater flexibility during drying or calcining can be achieved by coupling several devices, whereby, as provided in one advantageous embodiment of the present invention, for example partial streams are also withdrawn along the transport path from individual parts of the device in conformity with a defined degree of calcining.

In this way, for example during the calcining of gypsum, calcium sulfate dihydrate that is largely free of adsorbed water can be withdrawn from the discharge of the first device, and calcium sulfate dihydrate or calcium sulfate beta hemihydrate can be withdrawn at the end of a further subsequent device, whereby with appropriate equipment, the pyro procedure can be carried out at least until anhydrite II is obtained.

It is particularly advantageous if the individual devices are disposed in stages relative to one another, as a result of which the transport of the powdery material from one device to the next is facilitated. However, it is also possible to dispose the devices one above the other.

Furthermore, it is possible to provide connecting lines between the individual devices to return or introduce the output of one device into the other device.

The inventive device can be adapted individually, or in combination with several units, to the respective product that is to be dried/calcined, and in particular, among other things, by: selection of the burners, the calcining temperature, regulation of the vibration/oscillation movement of the intermediate base, structural configuration of the vibration/oscillation base, arrangement of various intermediate bases relative to one another adjustment of the openings/pores of the intermediate base, the rake or inclination angle of the intermediate base, adjustment of the amplitude of the vibration-/oscillation base, guidance of the exhaust gas, removal of dust and return guidance of solid material and gas, and splitting of the treatment areas into zones in the direction of transport.

The inventive device furthermore offers the advantage that high throughput capacities can be achieved with very little energy. The vibrating motors that are used, for example, require only very little actuation power in order to transmit the desired oscillations to the base through which the gas flows. The frequency of the vibrator can preferably be regulated in order to be able to individually adjust the oscillation amplitude.

Also effected as a result of the fluidization of the fine powdery material that can be achieved with the inventive device is an optimum heat transfer to the goods that are to be treated, and hence an optimization of the drying or calcining process with regard to an energy supply that is as slight as possible, with the heat quantity necessary per kilogram of drying/calcining material being able to be further optimized by the described return of the exhaust gases and their guidance into heat exchangers in order to preheat the combustion air for the burners.

Further features of the present invention are indicated by the disclosure collectively as well as the remainder of the specification. A special alternative embodiment of the inventive device/unit provides for disposing several spaced apart air/gas-permeable bases one above the other within a single treatment area, and then guiding the material several times over one and/or several bases, with the device also being equipped with several feed and withdrawal mechanisms as well as appropriate return belts or other members. With a central heating from below, different temperature conditions in conformity to different drying/calcining levels of the material can then be set between the individual bases. Of course, additional calcining units and/or suction mechanisms can be provided between the individual bases. A particularly compact space and energy saving manner of construction can be realized with the preceding embodiment.

BRIEF DESCRIPTION OF THE DRAWING

The present invention is subsequently described in detail with the aid of a drawing. This drawing shows a plant that comprises several of the inventive devices, which are arranged in stages one after the other and are connected to one another. The drawing is largely schematic, and is subsequently described in detail not only with regard to its construction but also with regard to the operational sequence of the material that is guided through.

DESCRIPTION OF PREFERRED EMBODIMENTS

The inventive plant serves for the drying and calcining of so-called flue gas or desulfurization gypsum that results during the desulfurization of flue gas. The plant comprises three device sections 10, 12, 14 that have essentially the same construction.

Each device 10, 12, 14 has a feed mechanism 16, 18, 20, a heat treatment area 22, 24, 26, and a withdrawal mechanism 28, 30, 32. The treatment areas 22, 24, 26 essentially have a cuboid shape and are suspended and/or damped. (In the drawing, two of four such oscillation elements 34 are shown per treatment area 22, 24, 26, for example silent block type rubber-metal connections.)

Secured approximately in the center of the lower bottom 36 of the treatment areas 22, 24, 26 is a respective forced agitator 38. The latter is a vibrating device that can be driven hydraulically, electrically, or pneumatically.

The frequencies of these vibrators 38 are preferably controllable in order to be able to adjust the oscillation amplitude of each treatment area 22, 24, 26.

Disposed at about half the height of each treatment area 22, 24, 26 is a respective essentially horizontally oriented (intermediate) base 40, 42, 44. In the illustrated embodiment, the bases 40, 42, 44 are fixed to the pertaining treatment area 22, 24, 26, so that the oscillations produced by the forced agitator 38 are transmitted directly to the corresponding bases 40, 42, 44.

However, it is also possible, rather than fixing the force agitator 38 on the treatment areas 22, 24, 26, to link the agitators directly with the intermediate bases 40, 42, 44, which are then suspended, for example on an appropriate oscillation element in the treatment area 22, 24, 26.

The base 40 of the treatment area 22 comprises simple boiler plate (stainless steel). It is characterized by a plurality of extremely small openings (shown only schematically via the reference numeral 46). While the intermediate base itself has a size of about 3×10 meters, the diameter of the openings is, for example, about 10 to 50 $\mu$m. By stamping the plate parts in question, each opening is pressed out upwardly, thereby creating a quarter ball in the direction toward the rear container wall 48. All of the openings 46 are preferably formed in the same manner.

The base 42 comprises a sintered metal produced according to powder metallurgy procedures. Sintered materials are manufactured from metal powder or granules having a particle size of 0.5 $\mu$m to 1000 $\mu$m and/or from metal fibers that have a similar diameter. Different qualities can be produced via the selection of the forming and sintering procedure. Furthermore, it is also possible to use different raw materials.

In contrast to materials produced by melting metallurgy methods, the porosity is the characterizing parameter in powder metallurgy. Levels of porosity of up to 90% may be obtained for materials produced by powder metallurgy methods.

Even with these levels of porosity, adequate densities or strengths can be obtained. Depending upon the range of application, such an intermediate base of sintered metal can also be held by an appropriate for example honeycombed support. The orientation otherwise corresponds in its alternative forms to that of the base 40. The base is preferably produced from smooth or plain spherical particles of the same diameter. Materials that can be used include not only stainless steel and bronze, but also nickel, titanium, aluminum, tantalum, and special alloys, with the choice of each material also depending upon the temperature that is to be set in the treatment area 24.

The gas/air-permeable, large or surface elements produced from these or other materials have a quasi-polished surface that precludes adhesion, even in the case of a mechanical coating of solid particles. During production, the shape of each pore, especially on the surface, can be adjusted in such a way that the pores may be directed in a specific position. In the illustrated embodiment, the pores on the surface of the base 42 are inclined relative to the vertical axis in a direction toward the rear wall 50.

Finally, t he base 44 of the treatment area 26 is made of a sintered ceramic material that also has a high level of porosity. In contrast to the base 42, in this case the pores on the upper surface are not directed toward the rear wall 52 of the treatment area 26, but rather are inclined relative to the vertical in the direction toward the feed mechanism 20, i.e. against the material st ream, which will be described in detail subsequently.

If necessary, here too the refractory material can be reinforced by a reinforcement or a support. The orientation again corresponds to that of the base 40.

The bottom 36 of the treatment areas 22, 24, 26 has several spaced-apart openings 54, which are indicated only schematically in the drawing. A burner 56, 58, 60 is spaced slightly (2 to 5 mm) in front of each opening 54, and in particular in such a way that the associated hot gas stream can enter through the respective corresponding opening 54 into the treatment area 22, 24, or 26. The burners are selected as a function of the drying and calcining conditions and the temperatures that are to be adjusted in each case.

The space between the burners and the bottom 36 serves, among other things, for drawing in secondary air.

The burners are linked via gas lines 105 to an appropriate gas supply system (illustrated schematically in the drawing by the reference numeral 61), with the combustible gas mixture being preheated by a common heat exchanger 62.

Opening into the inlet side of a heat exchanger 62 is a line 64 that comes from the outlet side of a dust collection unit 66, for example an electronic filter.

The inlet side of the dust collection unit 66, in turn, is supplied by a feed line 68 into which end three partial streams 68a, b, c that come from the treatment areas 22, 24, or 26.

Provided in the upper half of each treatment area 22, 24, 26 are several suction mechanisms 70 (two only are shown in the drawing for each treatment area). Outgoing or exhaust air that might be loaded with solid particles is drawn out of each treatment area 22, 24, 26 by the suction mechanisms and is conveyed to the feed line 68 for introduction into the dust collection unit 66.

In order to control/regulate the suction capacity and quantity, servo components or adjustment members 74, for example simple valves or reducing dampers, are disposed directly behind the suction mechanisms 70 in the pertaining connecting line 72.

As can be seen in the drawing, each of the connecting lines 72 can extend together to the dust collection unit 66 after the adjustment members 7 via the intermediate lines 68a, b, c into the feed line 68.

In addition to the line 64 to the heat exchanger 62, an exhaust air line 76 leads from the dust collection unit 66 to the chimney or flue 78, with a fan 79 being interposed in the line 76 to produce a partial vacuum.

In addition, two conduits 80, 82 lead from the dust collection unit 66, with the solid particles that have been separated-off in the dust collection unit 66 being returned to the devices 10, 12, 14 via these conduits.

As readily shown in the drawing, the conduit 80 is divided at a distance from the dust collection unit 66, with a return line 80a leading to the feed mechanism 16, and a return line 80c leading to the withdrawal mechanism 28 of the device 10; appropriate receiving hoppers 84, 86 are provided in the transition regions. The transition regions are preferably embodied in a dust-impermeable manner, for example via a (not illustrated) flexible coupling.

In addition, the present invention is, of course, in no way restricted to the specific disclosure of the specification and drawing, but also encompasses any modifications within the scope of the appended claims.

In a similar manner as described in connection with the conduit 80, the conduit 82 is also divided into two sections, with a return line 82a leading in the same manner as previously described to the withdrawal mechanism 30 of the device 12, and with the return line 82b leading into the withdrawal mechanism of the device 14.

The withdrawal mechanism 28 of the device 10 is connected in a dust-impermeable manner to the feed mechanism 18 of the device 12 via a closed tube 88. In order to preclude the danger of a possibly undesirable oscillation transfer from one device to the other, the tube 88 is connected via flexible couplings 90 to the withdrawal mechanism 28 and the feed mechanism 18. Approximately in the middle between the couplings 90, the tube 88 has a branch 92, with a control element 94 being provided in the connection region in order to be able to transfer into the branch 92 and/or into the feed mechanism 18, in a regulated and/or controlled manner, a material stream that has been transported through the upper part of the tube 88.

In this way, a partial stream can be withdrawn via the branch 92.

The connection between the device 12 and the device 14 is also embodied in the same way as described above.

In contrast, the feed mechanism 16 of the device 10 has a funnel-shaped collection container to which is delivered the material stream that is to be treated (arrow A). Via a common connector 96, the collection container and the receiving hopper 84 open into the treatment area 22 of the device 10, with a coupling 98 being provided in the transition region to provide a dust seal.

The withdrawal mechanism 32 of the device 14 is similarly connected to the treatment area 26 via a flexible coupling 100. At the end of a downwardly directed discharge tube 102, the withdrawal mechanism 32 is provided with a discharge funnel 104 via which the material stream can be discharged downwardly (arrow B).

The inventive device (plant) operates as follows:

The desulfurization gypsum that is to be dried and calcined is introduced into the feed mechanism 16 in the direction of the arrow A. At this point, the desulfurization gypsum has an adsorbed surface humidity of about 10% by weight, and a water of crystallization content of about 20% by weight. From there, the material passes into the upper part of the treatment area 22 above the base 40.

Gas streams through the base 40 from below, and in particular via the burners 56. In this connection, the kinetic energy of the fuel gases discharged by the burners is sufficient to guide these gases through the base 40.

Adjustment is effected in that the material that is to be dried flows over the base 40, so that it is disaggregated or broken up after first being agglomerated. The transport of the particles from the feed mechanism 16 to the withdrawal mechanism 28 over the base 40 is effected on the one hand via the oscillation of the base 40, which preferably describes an involute movement having little amplitude, and on the other hand is also effected via the air for combustion that streams out of the openings 46. Depending upon the adjustment, a sort of periodical projectile motion of each particle along the base 40 in the direction toward the withdrawal mechanism 28 can also be produced. Due to the large number of very fine openings 46, a uniform flowing through of the material stream via hot air for combustion, and hence an intensive drying, is made possible. The thickness of the material layer is, for example, 2 to 8 cm and moves over the base 40 above the latter, with each particle periodically contacting the base, and again being repelled therefrom, during the appropriate oscillations of the base 40.

In order to adjust the speed of the stream of the fuel gases, the gas lines 105 to the burners 56 are provided with adjustment members 106.

The exhaust air is withdrawn upwardly via the suction mechanisms 70 and is conveyed to the dust collection unit 66. Particles of solid material floating or suspended in the treatment area 22 are carried along and are separated off in the dust collection unit 66.

As can be seen in the drawing, the treatment area 22 is divided above the base 40 into two sections by a vertically movable blind or plate 108 that divides the treatment area 22, in the direction of transport of the material 110, into two sections, with the plate 108 ending at a distance from the base 40. The suction mechanisms 70 are disposed in such a way that they can separately suction the space in front of and behind the plate 108.

In this way, zones having different air humidity and temperature can be established.

The material stream 110 leaves the device 10 at the outlet end, and passes via the tube 88 and the feed mechanism 18 into the treatment area 24. Here the material passes through above the base 42 in the same manner as described above, and is guided by the withdrawal mechanism 30, the tube 88, and the feed mechanism 20 into the treatment area 26, where the procedure is again repeated until the material is finally withdrawn in the direction of the arrow B via the withdrawal mechanism 32 and the discharge tube 102/the discharge funnel 104

During its treatment procedure, the material experiences various drying/calcining as a result of the temperatures set in each treatment area 22, 24, 26 by the burners 56, 58, 60. In the present case, temperatures of 400° to 500° C. exist in the first stage (device 10), temperatures of 700 to 800° C. exist in the second stage (device 12), and temperatures of up to 1200° C. exist in the third stage (device 14). In conformity therewith, only drying removal of the absorbed humidity is achieved in the first stage, whereas an increasing calcining is effected in the second and third stages.

Thus, the degree of removal of water can be adjusted as a function of the temperature and retention time of the material in the individual treatment areas 22, 24, 26 (for this purpose, the rake or angle of inclination of the bases 40, 42, 44 is also adjustable). In the illustrated embodiment, this is effected in such a way that calcium sulfate dihydrate (for example for the production of alpha and beta hemihydrate) is available in the transition region of the device 10 to the device 12, while in the transition region between the second and third stages, the material is already dehydrated to the so-called beta hemihydrate. At the end of the third stage, anhydrite II can be withdrawn.

The usefulness of the device of the present invention is much greater if, as shown in the drawing, the tubes 88 are connected via control element 94 to branches 92 via which the appropriate partial streams can be withdrawn in any desired quantity. Thus, practically any desired intermediate product can be obtained.

Especially in the illustrated application for calcining desulfurization gypsum, the quality and water-absorbing properties can additionally be influenced if, as illustrated in conjunction with the device 10, chambers of different degrees of humidity are formed, with the atmosphere in each section also being influenced by changing the adjustment members 74 via the quantity of fuel gas that is withdrawn.

Thus, the inventive device or plant offers numerous possibilities for carrying out procedures, and hence for influencing the quality of the product. The plant is suitable not only just for drying, such as by exclusively burning, but also, as illustrated, for continuously carrying out a drying/burning or calcining procedure.

Instead of a stepwise arrangement of the different devices, the material stream can also be guided several times through one and the same device by using appropriate return lines.

Pursuant to an alternative inventive embodiment, the material is not guided several times over the same base. Instead, the treatment area is equipped with several gas/air-permeable bases that are disposed one above the other and at a distance from one another, with the partial streams then being respectively guided to the next base via appropriate withdrawal and feed mechanisms. If a central heating of this device is provided, it is possible to set different temperature and humidity profiles at different levels within a given treatment area, with additional suction mechanisms then preferably being provided between the individual bases. If necessary, additional heating elements and/or fans could also be provided between the bases in order to assist the transport of the air for combustion. Not only is energy saved, but some of the burners are not needed and the number of forced agitators is reduced. Different bases can be oscillated with a vibrator disposed at the treatment area.

Instead of the complete, multi-stage plant illustrated in the drawing, it would also be possible to install a single device, or a device having several bases, as described above, directly in a power plant without difficulty due to its compactness and ease of use. The product extracted from the withdrawal mechanism 28 of the first unit can then be transported without difficulty due to the fact that water has been removed therefrom, and can be calcined further in a gypsum plant or, in the case of the last-mentioned embodiment, the product is already an end product that is ready for sale. The inventive device/plant is also suitable for drying/calcining coarser powder materials, such as natural gypsum, in a similar manner.

The inventive features described in the specification shown in the drawing and listed in the disclosure collectively can be essential both individuallY as well as in any combination with one another for realizing the various embodiments of the invention.

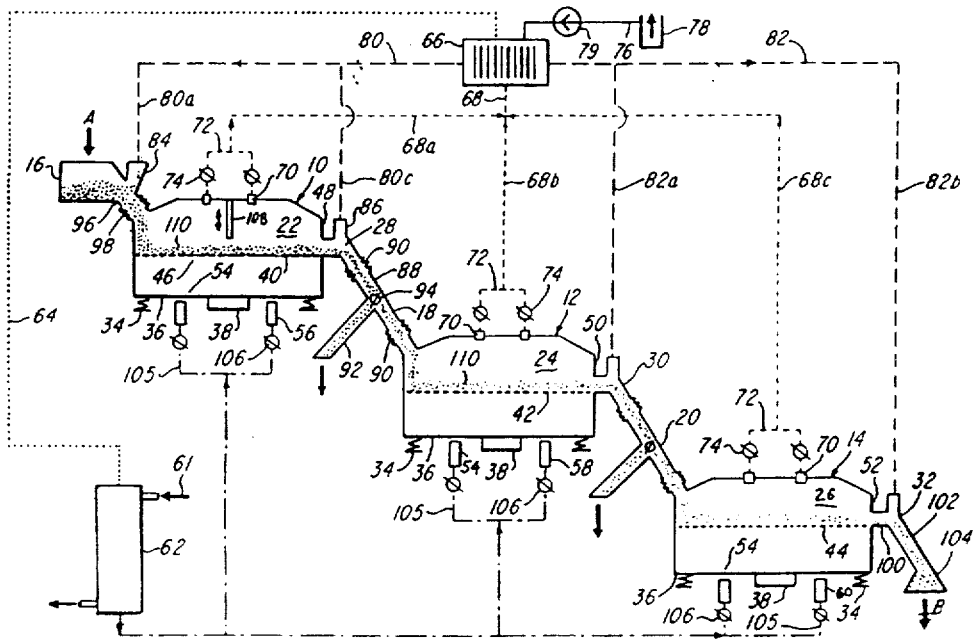

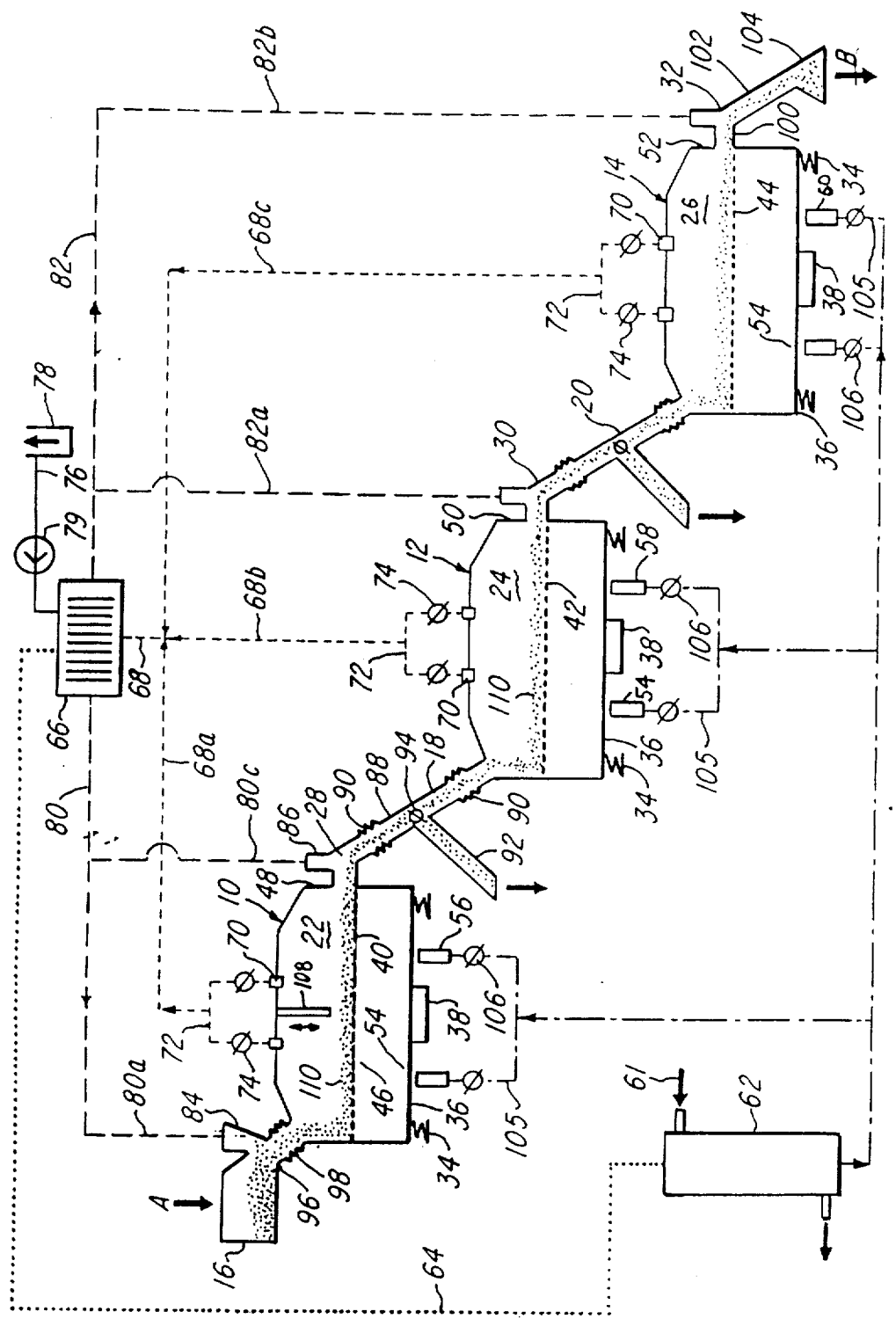

What I claim is:

1. A device for treating by selectively including drying and calcining powdery calcium sulfate hydrate material, comprising:
   at least one treatment area means;
   feed mechanism means for feeding material to said treatment area means;
   withdrawal mechanism means for withdrawing material from said treatment area means;
   at least one essentially horizontal base means disposed in said treatment area means for receiving said powdery calcium sulfate material thereon, said base means being adapted to vibrate or oscillate, and also being adapted to have hot air or hot gas flow therethrough from below; and
   transport means for conveying at least part of a stream of said material back from said withdrawal mechanism means to said feed mechanism means of said base means thereof respectively to the feed mechanism means of further base means arranged in distant relationship to said first mentioned base means in order to achieve an effect to automatic pelletizing of the material.

2. A device according to claim 1, and intended for drying respectively calcining material selected from the group consisting of powdery calcium sulfate hydrate products and finely divided chemical and desulfurization gypsum that predominantly has a grain size of less than 100 μm.

3. A device according to claim 1, in which said treatment area means comprises at least one treatment area, within which several bases that are disposed spaced from one another one above the other to divide said treatment area into sections, with each of which is associated a respective feed and withdrawal mechanism connectable to transport lines for at least partial return of material from or to an adjacent section of said treatment area.

4. A device according to claim 1, in which said treatment area means comprises several treatment areas that are spaced from one another and that are each provided with a base means and a respective transport connection for the material that is to be treated linking the withdrawal mechanism of one treatment area with the feed mechanism of the following treatment area.

5. A device according to claim 4, in which at least one of said treatment areas is provided with a supplemental withdrawal means.

6. A device according to claim 5, in which said supplemental withdrawal means is disposed in the region of said transport connection between two of said treatment areas.

7. A device according to claim 1, in which said means of said treatment area means, are arranged in a stepwise manner.

8. A device according to claim 1, in which said base means of said treatment area means, are arranged one above the other.

9. A device according to claim 1, in which at least one of said bases comprises a metal sheet that is provided with a plurality of very fine openings.

10. A device according to claim 1, in which at least one of said base means comprises a metal screen unit.

11. A device according to claim 1, in which at least one of said base means comprises material selected from the group consisting of compressed respectively sintered powdery respectively granulated material of high and fine porosity, and fired ceramic material of high porosity.

12. A device according to claim 1, in which said base means has a region that faces said material that is to be treated, with at least this region being provided with openings respectively pores that are oriented.

13. A device according to claim 1, in which said treatment area means is adapted to be divided into zones between said feed mechanism means and said withdrawal mechanism means thereof.

14. A device according to claim 13, which includes plate means disposed above said base means, between said feed mechanism means and said withdrawal mechanism means, and movable toward said base.

15. A device according to claim 1, in which said treatment area means has an upper section, above at least one of said bases, base means in which is disposed at least one suction mechanism that is preferably regulatable respectively controllable.

16. A device according to claim 15, which includes a dust collection unit to which is connected said at least one suction mechanism via first transport lines; which includes a second transport line that leads to a flue, with a fan being disposed in said second transport line; and which includes at least one third transport line that leads to said feed mechanism means respectively to said withdrawal mechanism means.

17. A device according to claim 16, which includes a heat exchanger that is connectable to hot-gas-generating means for said base means, with at least one line means, leading from at least one of said transport lines to said heat exchanger.

18. A device according to claim 1, in which said feed mechanism means and withdrawal mechanism means, and connecting lines respectively return lines thereof, are embodied as vibration respectively air-conveyer chutes, to which hot gases can be supplied from below.

19. A device according to claim 1, in which said feed mechanism means and withdrawal mechanism means, and return lines thereof, are connected to said treatment area means in a dusttight respectively gastight manner.

20. A device according to claim 1, which includes hot-gas-generating means disposed below said base means.

21. A device according to claim 20, in which said treatment area means has a lower section below said base means, with said lower section having a bottom that is provided with opening means, with said hot-gas-generating means being disposed externally of said treatment area means at a slight distance in front of said opening means.

22. A device according to claim 1, in which said treatment area means has sections that are provided with their own burner units, exhaust air mechanisms, respectively.

23. A device according to claim 1, in which at least one base means is pulsatingly movable along an involute path of movement.

24. A device according to claim 1, which includes means for adjusting the angle of inclination of at least one base means relative to said treatment area means.

25. A device according to claim 1, in which each of said base means is elastically supported in said treatment area means and is provided with a forced agitator, such as a vibrator.

26. A device according to claim 1, in which said treatment are means as a whole is elastically supported and is provided with a forced agitator, such as a vibrator.

27. A device according to claim 1, in which said treatment area means comprises several treatment areas, and said transport means includes return lines for exhaust gases, with said return lines of one of said treatment areas leading back to one of the preceding upstream ones of said treatment areas.

28. A device according to claim 1, and intended for heat treating synthetic calcium sulfate hydrate products, especially those produced during flue gas desulfurization in power plants, for drying respectively calcining in different dehydration/gypsum phases.

29. A method of treating by selectively including drying and calcining finely divided chemical or desulfurization gypsum that predominantly has a grain size of less than 100 μm, said method including the step of conveying said material that is to be treated over base means in treatment area means, with hot air or hot gas flowing through said base means from below, and with said base means being continuously oscillated or vibrated at low amplitude, thereby fluidizing the stream of material over said base means, said step of conveying including successively conveying said material several times through a given treatment area means respectively through several treatment areas disposed one after the other in any desired arrangement to achieve automatic pelletizing of the material.

30. A device according to claim 29, in which said conveying step includes successively conveying said material several times through a given treatment area means.

31. A method according to claim 29, in which said conveying step includes conveying said material through several treatment areas disposed one after the other in any desired arrangement.

32. A method according to claim 29, which includes the step of conveying said material through several bases one after the other while at the same time subjecting said material to higher temperatures.

* * * * *

UNITED STATES PATENT AND TRADEMARK OFFICE
CERTIFICATE OF CORRECTION

PATENT NO. : 4,974,334

DATED : December 4, 1990

INVENTOR(S) : Roddewig

It is certified that error appears in the above-identified patent and that said Letters Patent is hereby corrected as shown below:

The title page showing the illustrative figure should be deleted to appear as per attached title page.

The sheet of drawings should be deleted to appear as per attached sheet.

Signed and Sealed this

Thirty-first Day of December, 1991

Attest:

HARRY F. MANBECK, JR.

*Attesting Officer*      *Commissioner of Patents and Trademarks*

United States Patent [19]

Roddewig

[11] Patent Number: 4,974,334
[45] Date of Patent: Dec. 4, 1990

[54] PROCEDURE AND DEVICE FOR DRYING AND/OR CALCINING OF POWDERY MATERIALS

[76] Inventor: Dieter Roddewig, Am Butterberg 35, 3360 Osterode, Fed. Rep. of Germany

[21] Appl. No.: 221,460
[22] PCT Filed: Dec. 3, 1986
[86] PCT No.: PCT/DE86/00495
  § 371 Date: Jul. 29, 1988
  § 102(e) Date: Jul. 29, 1988
[87] PCT Pub. No.: WO87/03508
  PCT Pub. Date: Jun. 18, 1987

[30] Foreign Application Priority Data
  Dec. 4, 1985 [DE] Fed. Rep. of Germany ....... 3542904

[51] Int. Cl.$^5$ .............................................. F26B 3/08
[52] U.S. Cl. ........................................ 34/10; 34/57 A; 34/164
[58] Field of Search ................ 34/57 A, 164, 11, 182, 34/10

[56] References Cited

U.S. PATENT DOCUMENTS

| | | | |
|---|---|---|---|
| 2,832,584 | 4/1958 | Plante | 34/164 X |
| 3,063,848 | 11/1962 | Van Gelder | 34/57 A X |
| 3,161,483 | 12/1964 | Morris | 34/164 |
| 4,305,210 | 12/1981 | Christensen et al. | 34/164 X |
| 4,371,375 | 2/1983 | Dennis, Jr. et al. | 34/11 |

*Primary Examiner*—Henry A. Bennet
*Attorney, Agent, or Firm*—Robert W. Becker & Associates

[57] ABSTRACT

Procedure and device for drying and/or calcining powdery material. The device includes at least one feed mechanism, a heated treatment area, and at least one withdrawal mechanism for the material. The treatment area is provided with a base that can vibrate and through which gas can flow.

32 Claims, 1 Drawing Sheet

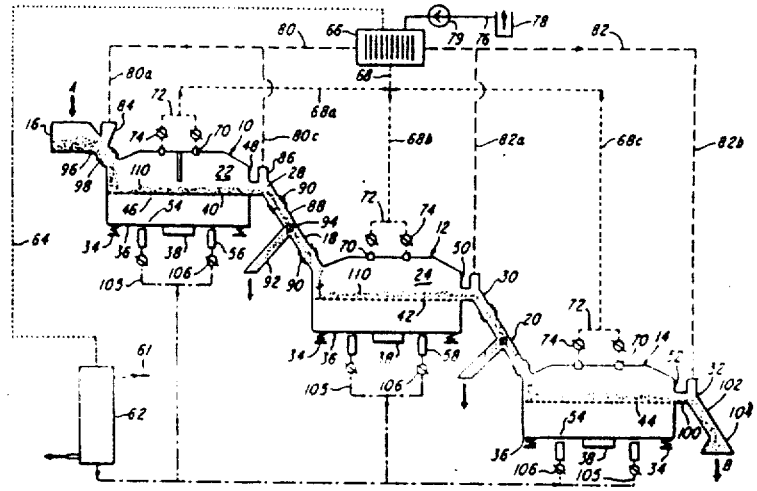

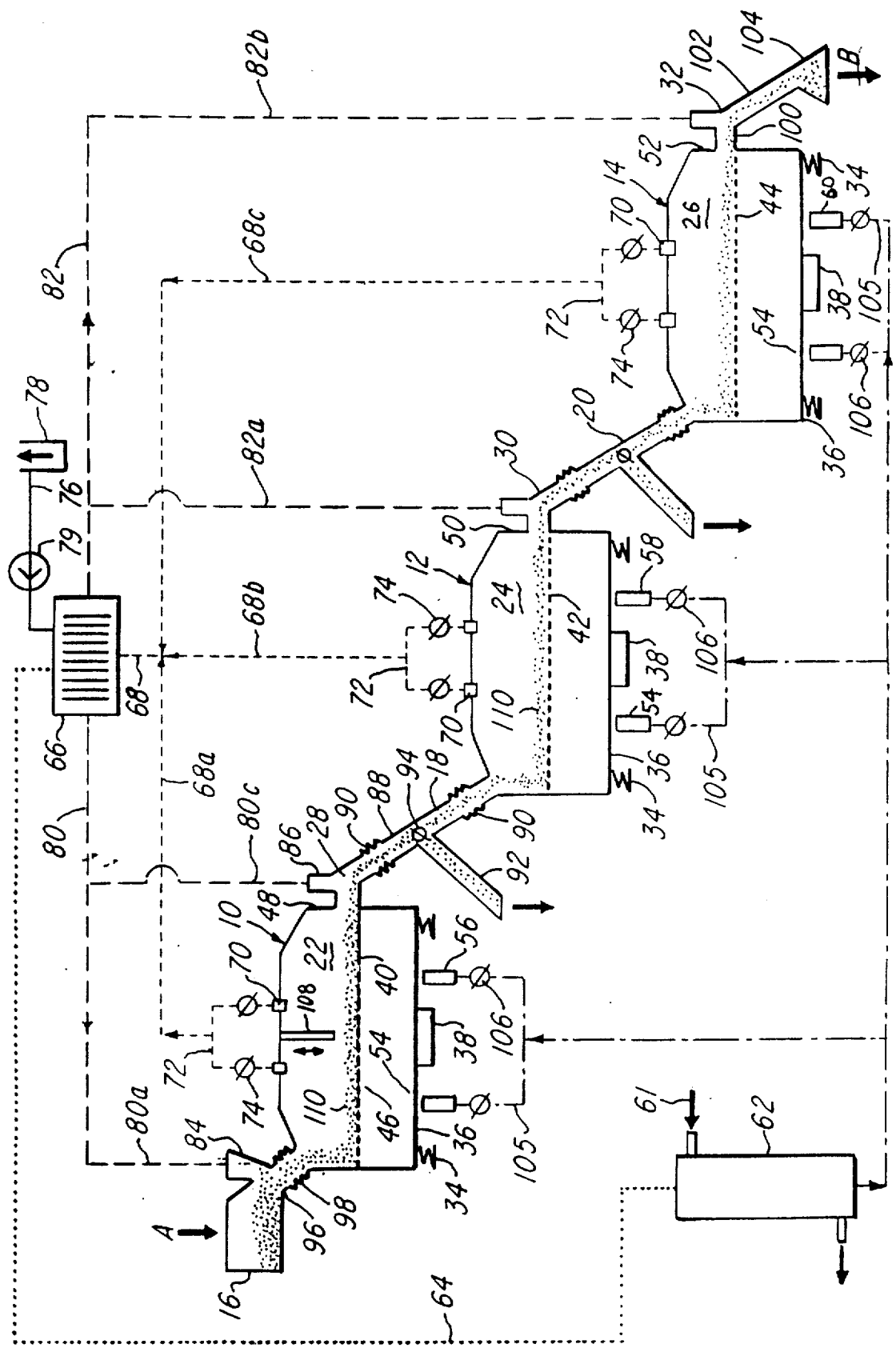

UNITED STATES PATENT AND TRADEMARK OFFICE
CERTIFICATE OF CORRECTION

PATENT NO. : 4,974,334
DATED : December 4, 1990
INVENTOR(S) : Roddewig

It is certified that error appears in the above-identified patent and that said Letters Patent is hereby corrected as shown below:

The title page showing the illustrative figure should be deleted to appear as per attached title page.

The sheet of drawing should be deleted to appear as per attached sheet.

This certificate supersedes Certificate of Correction issued December 31, 1991.

Signed and Sealed this

Twenty-fifth Day of February, 1992

Attest:

HARRY F. MANBECK, JR.

Attesting Officer

Commissioner of Patents and Trademarks

United States Patent [19]

Roddewig

[11] Patent Number: 4,974,334
[45] Date of Patent: Dec. 4, 1990

[54] PROCEDURE AND DEVICE FOR DRYING AND/OR CALCINING OF POWDERY MATERIALS

[76] Inventor: Dieter Roddewig, Am Butterberg 35, 3360 Osterode, Fed. Rep. of Germany

[21] Appl. No.: 221,460
[22] PCT Filed: Dec. 3, 1986
[86] PCT No.: PCT/DE86/00495
§ 371 Date: Jul. 29, 1988
§ 102(e) Date: Jul. 29, 1988
[87] PCT Pub. No.: WO87/03508
PCT Pub. Date: Jun. 18, 1987

[30] Foreign Application Priority Data

Dec. 4, 1985 [DE] Fed. Rep. of Germany ...... 3542904

[51] Int. Cl.⁵ .............................................. F26B 3/08
[52] U.S. Cl. ...................................... 34/10; 34/57 A; 34/164

[58] Field of Search ................ 34/57 A, 164, 11, 182, 34/10

[56] References Cited

U.S. PATENT DOCUMENTS

| 2,832,584 | 4/1958 | Plante ........................ 34/164 X |
| 3,063,848 | 11/1962 | Van Gelder .................. 34/57 A X |
| 3,161,483 | 12/1964 | Morris ........................ 34/164 |
| 4,305,210 | 12/1981 | Christensen et al. ......... 34/164 X |
| 4,371,375 | 2/1983 | Dennis, Jr. et al. ......... 34/11 |

Primary Examiner—Henry A. Bennet
Attorney, Agent, or Firm—Robert W. Becker & Associates

[57] ABSTRACT

Procedure and device for drying and/or calcining powdery material. The device includes at least one feed mechanism, a heated treatment area, and at least one withdrawal mechanism for the material. The treatment area is provided with a base that can vibrate and through which gas can flow.

32 Claims, 1 Drawing Sheet